United States Patent
Lee

(10) Patent No.: US 12,343,907 B2
(45) Date of Patent: Jul. 1, 2025

(54) POUCH FORMING APPARATUS AND METHOD

(71) Applicant: LG Energy Solution, Ltd., Seoul (KR)

(72) Inventor: Han Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 204 days.

(21) Appl. No.: 17/801,706

(22) PCT Filed: Apr. 29, 2021

(86) PCT No.: PCT/KR2021/005456
§ 371 (c)(1),
(2) Date: Aug. 23, 2022

(87) PCT Pub. No.: WO2021/246651
PCT Pub. Date: Dec. 9, 2021

(65) Prior Publication Data
US 2023/0278268 A1    Sep. 7, 2023

(30) Foreign Application Priority Data

Jun. 4, 2020  (KR) .......................... 10-2020-0067820

(51) Int. Cl.
*B29C 43/00*   (2006.01)
*B29C 43/36*   (2006.01)
(Continued)

(52) U.S. Cl.
CPC ........... *B29C 43/36* (2013.01); *H01M 50/105* (2021.01); *B29C 2043/3205* (2013.01);
(Continued)

(58) Field of Classification Search
CPC ..... B29C 43/027; B29C 43/36; B29C 43/361; B29C 51/00; B29C 51/082; B29C 51/26; B29C 51/30
See application file for complete search history.

(56) References Cited

U.S. PATENT DOCUMENTS 4,514,353 A * 4/1985 Alexander .............. B29C 51/30
                                                          425/398
4,778,439 A * 10/1988 Alexander ............ B29C 51/082
                                                          425/351

(Continued)

FOREIGN PATENT DOCUMENTS

CN     110574184 A    12/2019
CN     110635069 A    12/2019
(Continued)

OTHER PUBLICATIONS

Search Report dated Dec. 19, 2023 from the Office Action for Chinese Application No. 202180018279.4 Issued Dec. 20, 2023, pp. 1-3.

(Continued)

*Primary Examiner* — Thu Khanh T. Nguyen
(74) *Attorney, Agent, or Firm* — Lerner David LLP

(57) ABSTRACT

The present invention relates to a pouch forming apparatus comprising: a die, in which forming grooves are formed with a partition wall therebetween; and a punch member provided with a punch, which is configured to be inserted into each of the forming grooves to press the pouch film to form a pair of accommodation grooves in the pouch film, wherein the forming groove comprises a vertical space disposed above a forming groove bottom part connected to the partition wall and an inclined space connected to the vertical space and formed by providing an inner wall facing the partition wall, the inner wall defining an inclined surface.

9 Claims, 6 Drawing Sheets

(51) Int. Cl.
*H01M 50/105* (2021.01)
*B29C 43/32* (2006.01)
*B29L 31/34* (2006.01)

(52) U.S. Cl.
CPC ............... *B29C 2043/3602* (2013.01); *B29C 2043/366* (2013.01); *B29L 2031/3468* (2013.01)

(56) References Cited

U.S. PATENT DOCUMENTS

| | | | |
|---|---|---|---|
| 4,832,676 A * | 5/1989 | Johns | B31F 1/0077 264/320 |
| 6,344,162 B1 * | 2/2002 | Miyajima | B29C 43/36 425/123 |
| 8,480,551 B2 * | 7/2013 | Wnek | B31B 50/59 493/42 |
| 10,518,925 B2 * | 12/2019 | Kunihiro | B65D 1/265 |
| 2010/0143787 A1 | 6/2010 | Jung et al. | |
| 2011/0287308 A1 | 11/2011 | Kim et al. | |
| 2012/0055223 A1 | 3/2012 | Watanabe et al. | |
| 2013/0011721 A1 | 1/2013 | Kim et al. | |
| 2013/0101894 A1 | 4/2013 | Baba et al. | |
| 2013/0309346 A1 * | 11/2013 | Jones | B29C 43/36 425/394 |
| 2014/0304980 A1 | 10/2014 | Kim et al. | |
| 2017/0229682 A1 | 8/2017 | Fauteux et al. | |
| 2018/0219245 A1 | 8/2018 | Choi et al. | |
| 2019/0044099 A1 | 2/2019 | Kang | |
| 2019/0229301 A1 | 7/2019 | Li et al. | |
| 2019/0305260 A1 | 10/2019 | Kim et al. | |
| 2019/0366654 A1 | 12/2019 | Ueno et al. | |
| 2019/0386330 A1 | 12/2019 | Choi et al. | |
| 2019/0393452 A1 | 12/2019 | Kim et al. | |
| 2020/0067029 A1 | 2/2020 | Park et al. | |
| 2020/0111999 A1 | 4/2020 | Kim et al. | |
| 2020/0112001 A1 | 4/2020 | Jung et al. | |
| 2020/0168852 A1 * | 5/2020 | Oh | B29C 53/02 |
| 2020/0331187 A1 * | 10/2020 | Suh | B29C 51/266 |
| 2020/0403191 A1 | 12/2020 | Kang | |
| 2021/0086388 A1 | 3/2021 | Lee et al. | |
| 2021/0344067 A1 | 11/2021 | Kang | |
| 2022/0102786 A1 | 3/2022 | Kim et al. | |
| 2023/0006288 A1 | 1/2023 | Kim et al. | |
| 2023/0330900 A1 * | 10/2023 | Oh | B29C 43/027 |
| 2025/0023148 A1 | 1/2025 | Kim et al. | |

FOREIGN PATENT DOCUMENTS

| | | |
|---|---|---|
| CN | 110809507 A | 2/2020 |
| CN | 110870090 A | 3/2020 |
| EP | 3584055 A1 | 12/2019 |
| EP | 3644390 A1 | 4/2020 |
| JP | 2002361669 A | 12/2002 |
| JP | 2002367574 A | 12/2002 |
| JP | 2004071301 A | 3/2004 |
| JP | 2010509711 A | 3/2010 |
| KR | 100684845 B1 | 2/2007 |
| KR | 20070109080 A | 11/2007 |
| KR | 20080038466 A | 5/2008 |
| KR | 101243560 B1 | 3/2013 |
| KR | 101253671 B1 | 4/2013 |
| KR | 101357319 B1 | 2/2014 |
| KR | 20160096417 A | 8/2016 |
| KR | 20170002013 A | 1/2017 |
| KR | 20170052061 A | 5/2017 |
| KR | 101801232 B1 | 11/2017 |
| KR | 20170124882 A | 11/2017 |
| KR | 101811835 B1 | 1/2018 |
| KR | 20180062874 A | 6/2018 |
| KR | 20180071982 A | 6/2018 |
| KR | 20180071983 A | 6/2018 |
| KR | 20190024755 A | 3/2019 |
| KR | 20190090153 A | 8/2019 |
| KR | 20190093045 A | 8/2019 |
| KR | 20190098581 A | 8/2019 |
| KR | 20190105765 A | 9/2019 |
| KR | 20200000966 A | 1/2020 |
| KR | 20200061033 A | 6/2020 |
| WO | 2016006403 A1 | 1/2016 |
| WO | 2019151638 A1 | 8/2019 |

OTHER PUBLICATIONS

International Search Report for Application No. PCT/KR2021/005456 mailed Aug. 4, 2021, pp. 1-3.
Extended European Search Report for Application No. 21816986.0 dated Jun. 27, 2023. 5 pgs.

* cited by examiner

POUCH FORMING APPARATUS AND METHOD

CROSS-REFERENCE TO RELATED APPLICATIONS

The present application is a national phase entry under U.S.C. § 371 of International Application No. PCT/KR2021/005456, filed on Apr. 29, 2021, which claims the benefit of the priority of Korean Patent Application No. 10-2020-0067820, filed on Jun. 4, 2020, which is hereby incorporated by reference.

TECHNICAL FIELD

The present invention relates to a pouch forming apparatus and method, and more particularly, to a pouch forming apparatus and method which prevent cracks from occurring when the pouch is formed.

BACKGROUND ART

In general, secondary batteries refer to chargeable and dischargeable, unlike primary batteries that are not chargeable. Secondary batteries are being widely used for mobile phones, notebook computers, and camcorders, electric vehicles, and the like.

Secondary batteries are classified into a can-type secondary battery, in which an electrode assembly is embedded in a metal can, and a pouch-type secondary battery, in which an electrode assembly is embedded in a pouch. The pouch-type secondary battery comprises an electrode assembly, in which electrodes and a separator are alternately stacked, a pouch, which accommodates the electrode assembly, and an electrode lead coupled to an electrode tab provided in the electrode assembly. Here, the electrode tab and the electrode lead are coupled to each other through welding.

Here, the pouch comprises upper and lower cases in which an accommodation part for accommodating the electrode assembly is formed, and the upper and lower cases are connected to each other by a bent part.

A pouch having such a structure is manufactured by a pouch forming apparatus.

That is, the pouch forming apparatus comprises a die in which a forming groove is formed, with a pouch film disposed in the forming groove, and a punch member comprising a punch provided above the die and inserted into the forming groove of the die to form an electrode assembly accommodation part having a cut shape in the pouch film.

However, in the pouch forming apparatus, when the pouch film is formed to form the accommodation part, an inner wall of the accommodation part is vertically elongated. Here, there is a problem in that cracks occur due to an increase in elongation rate of the inner wall of the accommodation part.

DISCLOSURE OF THE INVENTION

Technical Problem

The present invention is invented to solve the above problem, and an object of the present invention is to significantly reduce an elongation rate of an inner wall of one side of an accommodation part by forming the inner wall of one side of the accommodation part into an inclined surface when forming the accommodation part by forming a pouch film, thereby preventing cracks from occurring.

Technical Solution

A pouch forming apparatus according to the present invention for achieving the above object comprises: a die, in which forming grooves are formed with a partition wall therebetween in a top surface of a pouch film; and a punch member provided with a punch, which is inserted into each of the forming grooves in a state of pressing the pouch film to form a pair of accommodation grooves in the pouch film, wherein the forming groove comprises a vertical space disposed above a forming groove bottom part connected to the partition wall and an inclined space connected to the vertical space and formed by providing one inner wall thereof facing the partition wall as an inclined surface, the punch comprises a vertical block inserted into the vertical space in a state of pressing the pouch film and an inclined block inserted into the inclined space in a state of pressing the pouch film, wherein one surface of the inclined block, which faces the one inner wall, is provided as an inclined surface, and one inner surface of the accommodation groove, which is disposed between the inclined surface of the inclined space and the inclined surface of the inclined block is formed into an inclined surface.

The pouch forming apparatus may further comprise a coupling means configured to detachably couple the inclined block to the vertical block.

The coupling means may comprise a coupling groove formed in the vertical block and a coupling protrusion formed on the inclined block and coupled to the coupling groove.

The inclined block may comprise a first block having an inclined surface at a first angle, a second block having an inclined surface at a second angle, and an n-th block having an n-th inclination angle, and a block having an inclination angle corresponding to the inclined surface of the inclined space among the first, second, and n-th blocks may be coupled to the vertical block.

The inclined block may have an inclination angle of 30° to 60°.

The pouch forming apparatus may further comprise a fixing member configured to fix the inclined block to the punch member.

A finishing member configured to finish a gap between the vertical block and the inclined block may be further provided between the vertical block and the inclined block.

The finishing member may comprise a coupling part coupled to be inserted between the vertical block and the inclined block and a support part configured to support each of bottom surfaces of the vertical block and the inclined block, and a bottom surface of the support part may be disposed on the same horizontal line as the bottom surfaces of the vertical block and the inclined block.

A pouch forming method according to the present invention comprises: a pouch disposition step of disposing a pouch film on a die, in which forming grooves are formed with a partition wall therebetween in a top surface thereof, wherein each of the forming grooves is partitioned into a vertical space disposed above a forming groove bottom part connected to the partition wall and an inclined space connected to the vertical space and formed by providing one inner wall thereof facing the partition wall as an inclined surface; a punch member preparation step of preparing a punch member comprising a punch, wherein the punch comprises a vertical block inserted into the vertical space in a state of pressing the pouch film and an inclined block inserted into the inclined space in a state of pressing the pouch film, and an outer surface of the inclined block, which corresponds to the inclined surface of the inclined space, is provided as an inclined surface; and a pouch forming step of inserting the punch member comprising the punch into each of the forming grooves in the state of pressing the pouch film disposed on the die to form a pair of accommodation grooves in the pouch film, wherein an outer inner wall of the accommodation groove facing the partition wall is formed into an inclined surface by the inclined surface of the inclined block and the inclined surface of the forming groove.

In the punch member preparation step, the inclined block may comprise a first block having an inclined surface at a first angle, a second block having an inclined surface at a second angle, and an n-th block having an n-th inclination angle, and a block having an inclination angle corresponding to the inclined surface of the forming groove among the first, second, and n-th blocks may be coupled to the vertical block.

The punch member preparation step may further comprise a process of fixing the inclined block to the punch member through a fixing member when the inclined block is coupled to the vertical block.

Advantageous Effects

The pouch forming apparatus according to the present invention may comprise the die having the forming groove and the punch member provided with the punch. Here, any one of the side walls of the die and any one or more of the side surfaces of the punch may be provided as the inclined surface to form one or more inclined surfaces of the inner walls of the accommodation part formed in the pouch film. Therefore, the elongation rate of the inner wall of the accommodation part may be significantly reduced to prevent the cracks from occurring in the inner wall of the accommodation part.

That is, in the pouch forming apparatus according to the present invention, the forming groove of the die may form the vertical space and the inclined space, and the punch may comprise the vertical block inserted into the vertical space and the inclined block inserted into the inclined space. Due to the above-described characteristics, when the accommodation groove is formed in the pouch through the die and the punch, the outer inner wall of the accommodation part disposed between the inclined space and the inclined block may be formed as the inclined surface.

Particularly, the forming apparatus for the secondary battery according to the present invention may comprises the coupling means that detachably couples the inclined block to the vertical block. Due to the above-described characteristic, any one of the plurality of inclined blocks having various inclination angles may be used by being coupled to the vertical block, and thus, the accommodation groove having various inclination angles may be formed.

In addition, in the forming apparatus for the secondary battery according to the present invention, the coupling means may comprise the coupling groove and the coupling protrusion, which are respectively provided in the vertical block and on the inclined block. Due to the above-described characteristics, the vertical block and the inclined block may be easily coupled to or separated from each other.

The forming apparatus for the secondary battery according to the present invention may further comprise the fixing member for fixing the vertical block and the inclined block so as not to move. Due to the above-described characteristic, the accident in which the inclined block and the vertical block are separated from each other when the pouch film is formed may be significantly prevented.

MODE FOR CARRYING OUT THE INVENTION

Figure 1:
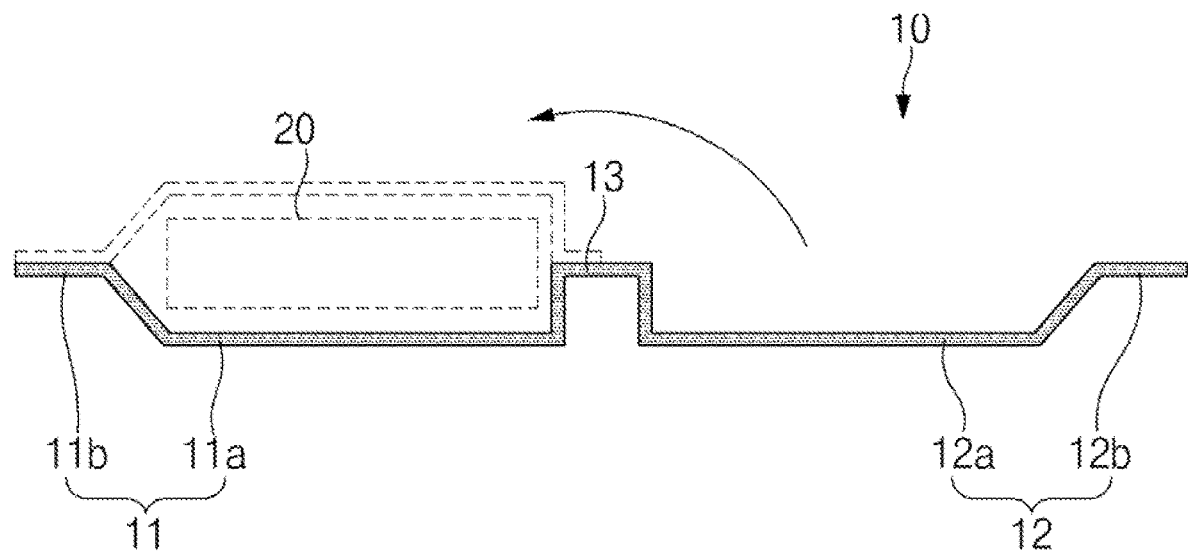
FIG. 1 is a cross-sectional view of a pouch according to a first embodiment of the present invention.
Figure 2:
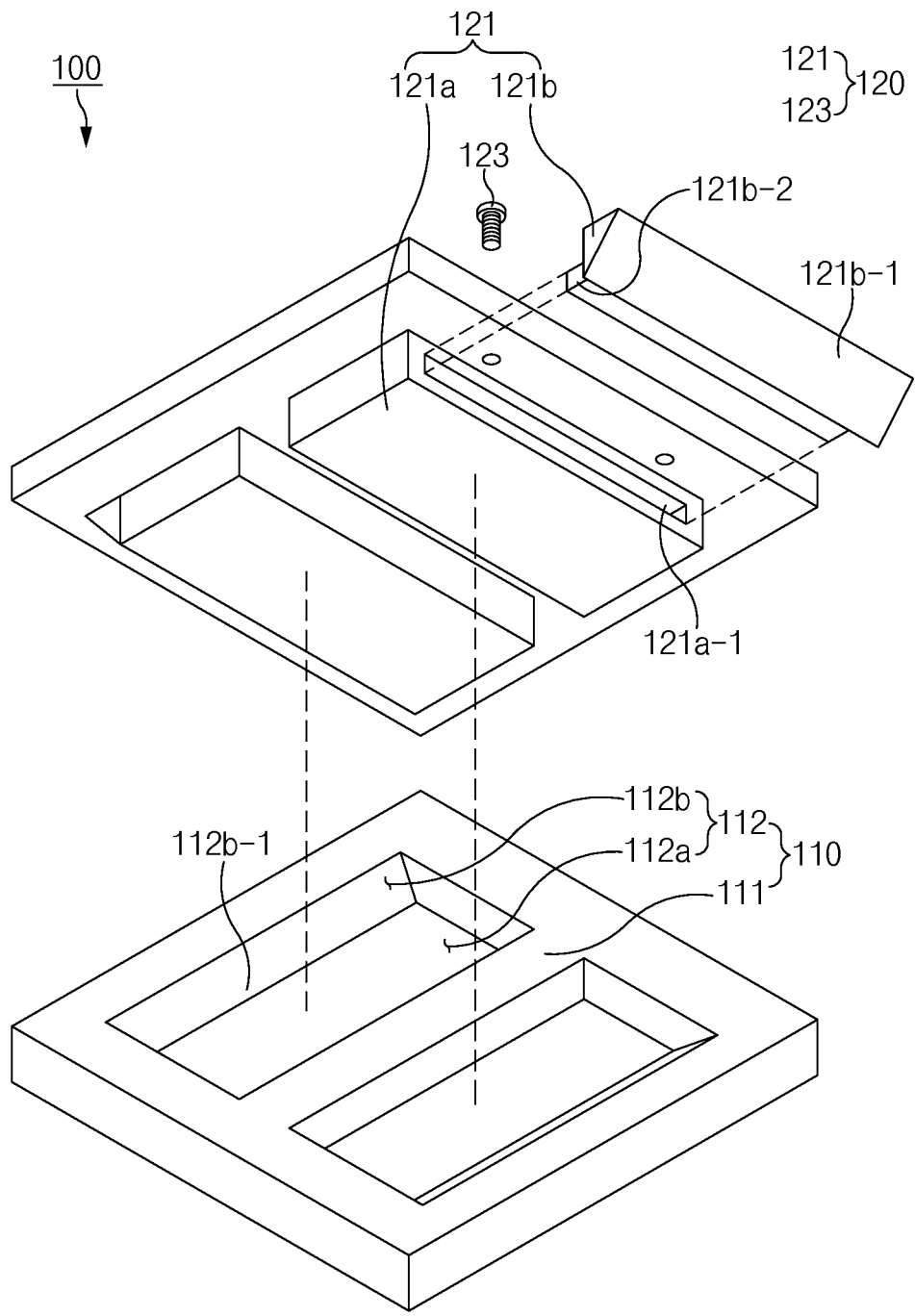
FIG. 2 is an exploded perspective view of a pouch forming apparatus for a secondary battery according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a pouch 10 according to a first embodiment of the present invention is configured to accommodate an electrode assembly and comprises one case 11 accommodating one side of the electrode assembly 20, the other case 12 accommodating the other side of the electrode assembly 20, and a bent part 13 connecting the one case 11 to the other case 12.

The one case 11 comprises one accommodation groove 11a accommodating one side of the electrode assembly 20 and one sealing surface 11b formed on an edge surface of the one accommodation groove 11a, and the other case 12 comprises the other accommodation groove 12a accommodating the other side of the electrode assembly 20 and the other sealing surface 12b formed on an edge surface of the other accommodation groove 12a.

Here, the one and the other accommodation grooves 11a and 12a are connected to each other to form the accommodation part accommodating the entire electrode assembly 20, and the one and the other sealing surfaces 11b and 12b are sealed to form a sealing part sealing the accommodation part.

The pouch 10 having the above-described structure is manufactured by the pouch forming apparatus according to the first embodiment of the present invention. Particularly, a pouch forming apparatus according to the first embodiment of the present invention has a structure that prevents cracks from occurring when the pouch is manufactured.

Hereinafter, the pouch forming apparatus according to the first embodiment of the present invention will be described in more detail.

As illustrated in FIGS. 1 to 4, a pouch forming apparatus 100 according to the first embodiment of the present invention is an apparatus for manufacturing a pouch by forming a pouch film. The pouch forming apparatus comprises a die 110, on which a pouch film 10a is disposed, and a punch member 120 forming the pouch film 10a disposed on the die 110 to manufacture a pouch 10.

In the die 110, grooves 112 having the same size and shape are formed in a top surface, on which the pouch film 10a is disposed, with a partition wall 111 therebetween.

The forming groove 112 comprises a vertical space 112a or indentation connected to or adjacent the partition wall 111 and, the forming groove 112 having one inner wall 112b-1 facing the partition wall 111 as an inclined surface, the inner wall 112b-1 adjacent the vertical space 112a.

Figure 3:
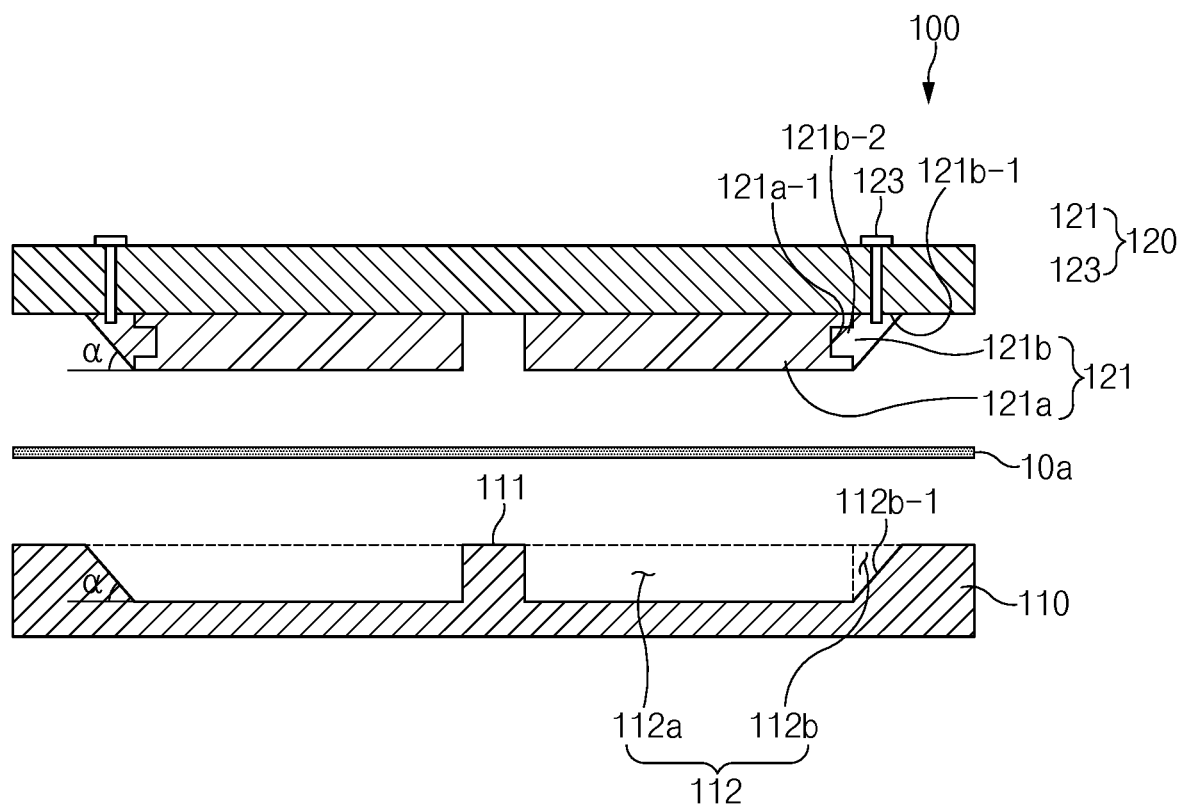
FIG. 3 is a cross-sectional view illustrating a state in which the pouch forming apparatus for the secondary battery, which is illustrated in FIG. 2, is coupled.
Figure 4:
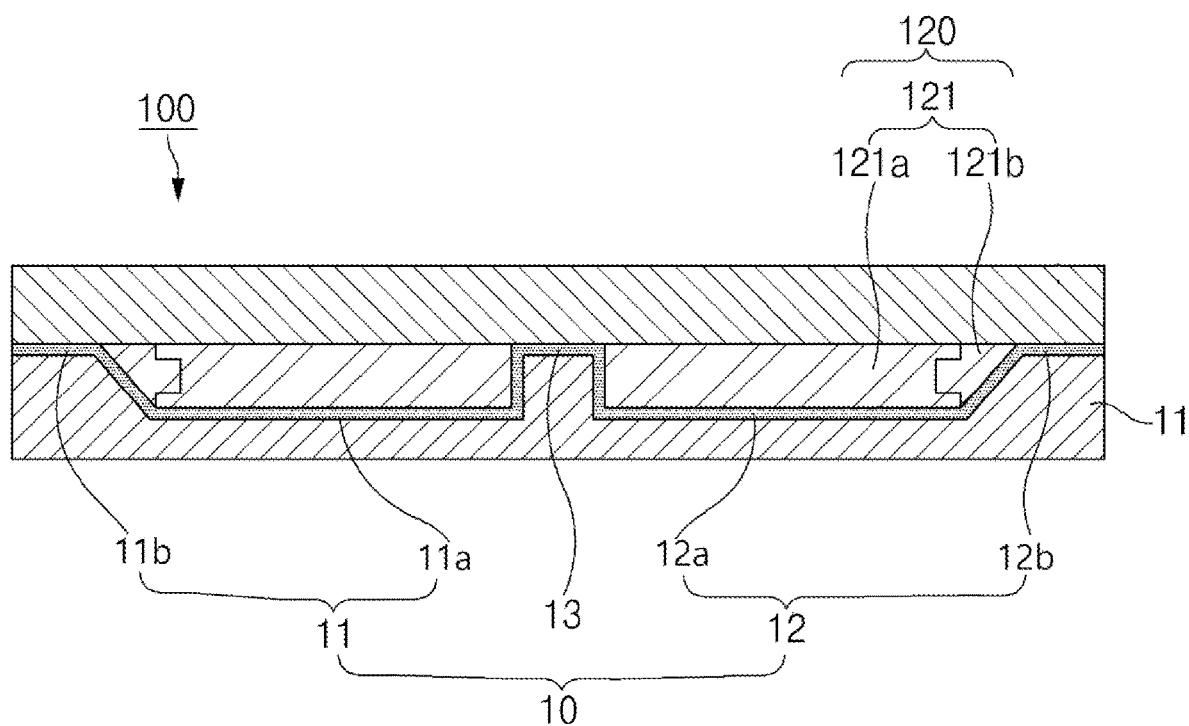
FIG. 4 is a cross-sectional view illustrating a state of use of the pouch forming apparatus for the secondary battery according to the first embodiment of the present invention.

That is, referring to FIG. 3, the forming groove 112 comprises the vertical space 112a formed at one side adjacent to the partition wall 111 and the inclined space 112b formed at the other side (i.e., adjacent to the vertical space 112a on a side of the vertical space 112a opposite the partition wall 111), and the vertical space 112a and the inclined space 112b are connected or adjacent to each other.

Here, referring to FIG. 3, the one inner wall 112b-1 of the inclined space 112b facing the partition wall 111 is formed as an inclined surface of which a width of the accommodation groove 112 gradually increases from the bottom part to an upper end of the accommodation groove 112.

The punch member 120 comprises a punch 121 that is inserted into each of the forming grooves 121 in a state of pressing the pouch film 10a to form a pair of accommodation grooves 11a and 12a in the pouch film 10a.

Here, the punch 121 comprises a vertical block 121a inserted into the vertical space 112a in the state of pressing the pouch film 10a and an inclined block 121b inserted into the inclined space 112b in the state of pressing the pouch film 10a, wherein one surface 121b-1 of the inclined block 121b, which corresponds to the one inner wall 112b-1, is provided as an inclined surface.

That is, the one surface 121b-1 of the inclined block 121b and the one inner wall 112b-1 of the inclined space 112b are formed as inclined surfaces having the same inclination angle. The one surface 121b-1 of the inclined block 121b may correspond to the one inner wall 112b-1 of the inclined space 112b.

In the pouch forming apparatus 100 according to the first embodiment of the present invention having the above configuration, the pouch film 10a is disposed on the top surface of the die 110, and then, when the punch member 120 provided with the punch 121 descends to be in close contact with the pouch film 10a disposed on the top surface of the die 110, the punch 121 is inserted into the forming groove 112 of the die 110 to form the pair of accommodation grooves 11a and 12a in a surface of the pouch film 10a. Here, one inner surface of each of the accommodating grooves 11a and 12a disposed between the inclined surface of the inclined space 112b and the inclined surface of the inclined block 121b is formed into an inclined surface, and thus, an elongation rate is significantly reduced to prevent cracks from occurring.

The pouch forming apparatus 100 according to the first embodiment of the present invention comprises a coupling means that detachably couples the inclined block 121b to the vertical block 121a. That is, since the inclined block 121b and the vertical block 121a are detachably coupled to each other through the coupling means, when the inclined block 121b is worn, the worn inclined block 121b may be replaced with a new inclined block to improve efficiency of use.

For example, the coupling means comprises a coupling groove 121a-1 formed in the vertical block 121a and a coupling protrusion 121b-2 formed on the inclined block 121b and coupled to the coupling groove 121a-1. That is, the coupling means may easily couple the vertical block 121a to the inclined block 121b through the coupling of the coupling groove 121a-1 and the coupling protrusion 121b-2 and may easily separate the vertical block 121a from the inclined block 121b through separation of the coupling groove 121a-1 and the coupling protrusion 121b-2.

An uneven surface or a ledge may be formed on the close contact surface of the coupling groove 121a-1 and the coupling protrusion 121b-2, and thus, coupling force between the coupling groove 121a-1 and the coupling protrusion 121b-2 may increase to significantly prevent the coupling force between the coupling groove 121a-1 and the coupling protrusion 121b-2 from being weakened by external impacts or vibration. In other words, the coupling protrusion 121b-2 may extend into the coupling groove 121a-1 to improve the strength of the connection between the vertical block 121a and the inclined block 121b.

The coupling protrusion 121b-2 has a hollow portion therein. Thus, when the coupling groove 121a-1 and the coupling protrusion 121b-2 are coupled to each other, the coupling protrusion 121b-2 may be partially pressed in a direction of the hollow and then be deformed. As a result, the coupling groove 121a-1 and the coupling protrusion 121b-2 may be more easily coupled to each other.

In the pouch forming apparatus 100 according to the first embodiment of the present invention, the inclined block 121b comprises a first block having an inclined surface at a first angle, a second block having an inclined surface at a second angle, and an n-th block having an n-th inclination angle. Here, a block having an inclination angle corresponding to the inclined surface of the inclined space among the first, second, and n-th blocks is coupled to the vertical block 121a. Thus, the punches having various inclination angles may be obtained, and as a result, an accommodation groove having a desired inclination angle may be formed when manufacturing the pouch.

Here, the inclination angle of the inclined block 121b is 30° to 60° with respect to the bottom surface of the accommodation groove, and preferably, the inclined block 121b has an inclination angle of 45°. That is, if the inclination angle of the inclined block 121b is 300 or less, the occurrence of the cracks may be prevented rather than to the vertical plane, but cracks may occur due to a steep inclination, and if the inclination angle of the inclined block 121b is 60° or more, an unnecessary space in which the electrode assembly is not accommodated is greatly expanded to deteriorate battery performance. Thus, the inclination angle of the inclined block 121b is formed to be 30° to 60° with respect to the bottom surface of the accommodation groove.

The pouch forming apparatus 100 according to the first embodiment of the present invention further comprises a fixing member 123 for fixing the inclined block 121b to the punch member 120.

The fixing member 123 passes through the punch member 120 to fix the inclined block 121b by pressing the inclined block 121b or by being coupled to the inclined block 121b. Thus, the inclined block 121b coupled to the vertical block 121a may be fixed so as not to be separated.

Hereinafter, a pouch forming method according to the first embodiment of the present invention will be described.

Figure 5:
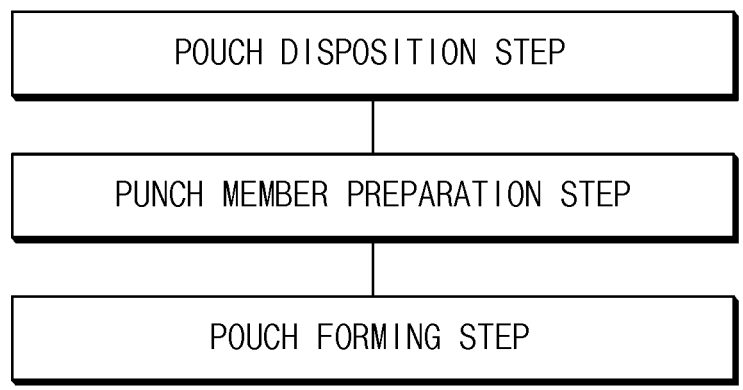
FIG. 5 is a flowchart illustrating a pouch forming method for the secondary battery according to the first embodiment of the present invention.

As illustrated in FIG. 5, a pouch forming method according to the first embodiment of the present invention comprises a pouch disposition step, a punch member preparation step, and a pouch forming step.

Here, the pouch forming method according to the first embodiment of the present invention uses the pouch forming apparatus 100 described above, and the pouch forming apparatus 100 comprises a die 110 and a punch member 120.

In the pouch disposition step, a pouch film 10a is disposed on a top surface of the die 110. That is, the pouch film 10a is disposed on the top surface of the die 110 in which forming grooves 112 are formed with a partition wall 111 therebetween.

Here, each of the forming grooves 112 is partitioned into a vertical space 112a disposed above a bottom part of the forming groove 12 connected to the partition wall 111 and an inclined space 112b connected to the vertical space 112a and formed by providing an outer inner wall 112b-1 facing the partition wall 111 as an inclined surface.

The punch member preparation step prepares the punch member 120 provided with a punch 121.

Here, the punch 121 comprises a vertical block 121a inserted into the vertical space 112a in a state of pressing the pouch film 10a and an inclined block 121b inserted into the inclined space 112b in a state of pressing the pouch film 10a. An outer surface of the inclined block 121b, which corresponds to an inclined surface of the inclined space 112b, is provided as an inclined surface.

Here, the vertical block 121a and the inclined block 121b are coupled to each other by a coupling means. That is, the coupling means comprises a coupling groove 121a-1 formed in the vertical block 121a and a coupling protrusion 121b-2 formed on the inclined block 121b and coupled to the coupling groove 121a-1. The vertical block 121a and the inclined block 121b may be easily coupled to each other through the coupling groove 121a-1 and the coupling protrusion 121b-2.

In the punch member preparation step, the inclined block 121b comprises a first block having an inclined surface at a first angle, a second block having an inclined surface at a second angle, and an n-th block having an n-th inclination angle. Here, a block having an inclination angle corresponding to the inclined surface of the inclined space among the first, second, and n-th blocks is coupled to the vertical block. Thus, the punch member 120 provided with inclined blocks having various inclination angles may be assembled.

When the coupling of the vertical block 121a and the inclined block 121b is completed, the punch member preparation step further comprises a process of fixing the inclined block 121b to the punch member 120 through the fixing member 123. Thus, the vertical block 121a and the inclined block 121b may be prevented from being separated from each other by external impacts and vibration.

In the pouch forming step, the pouch film 10a disposed on the die 110 is pressed through the punch member 120 provided with the punch 121. Here, a pair of accommodation grooves are formed in the pouch film 10a while the punch 121 is inserted into each of the forming grooves 112. Particularly, while an inclined surface of the inclined block 121b and an inclined surface of the forming groove are in close contact with each other, an outer inner wall of the accommodation groove facing the partition wall 111 is formed as an inclined surface.

When the pouch forming step is completed as described above, the pouch 10 may be manufactured as illustrated in FIG. 1.

Hereinafter, in describing another embodiment of the present invention, the same reference numerals are used for the same components as those of the above-described embodiment, and duplicated descriptions will be omitted.

Figure 6:
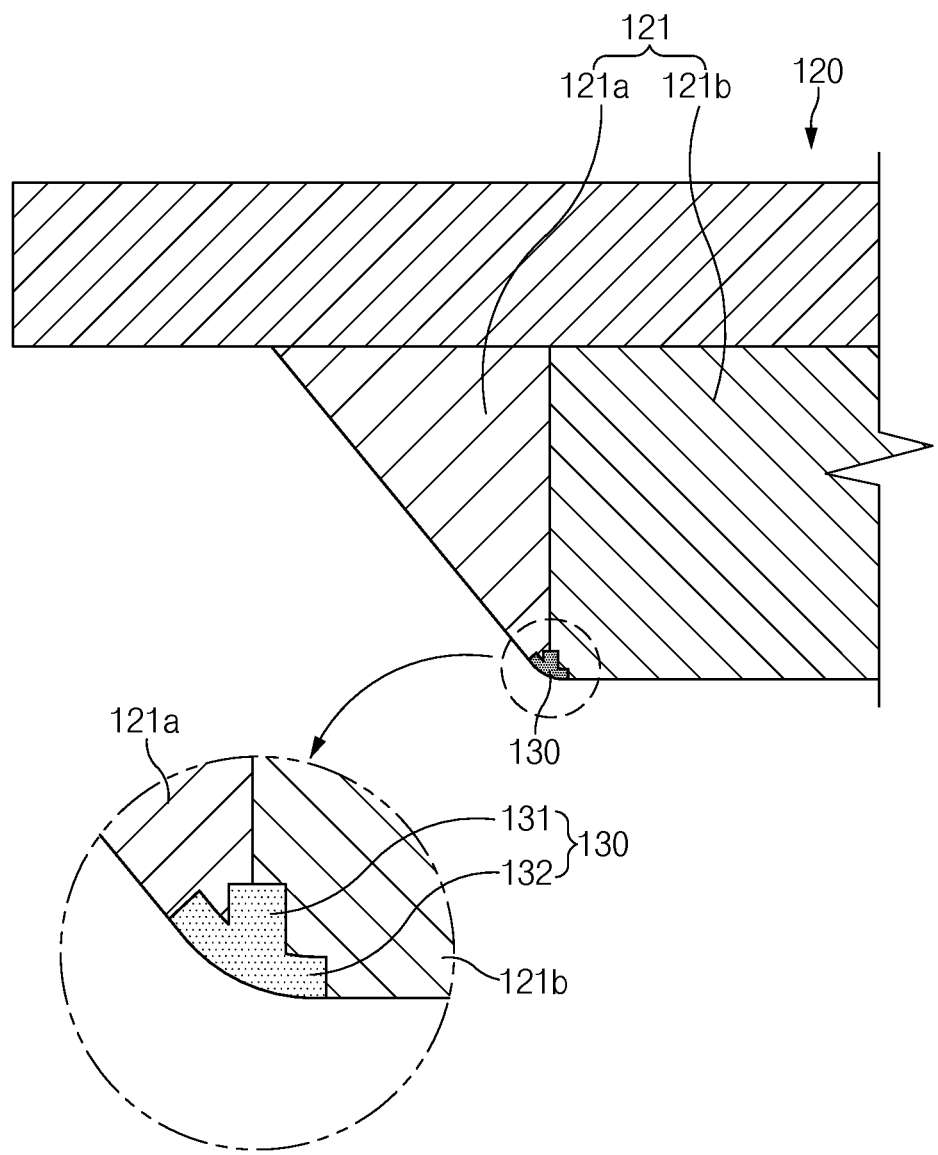
FIG. 6 is a cross-sectional view of a pouch according to a second embodiment of the present invention.

As illustrated in FIG. 6, a pouch forming apparatus 100 according to a second embodiment of the present invention further comprises a finishing member 130 provided between a vertical block 121a and an inclined block 121b to finish a gap between the vertical block 121a and the inclined block 121b.

That is, since an uneven surface is formed when the pouch is formed due to the gap between the vertical block 121a and the inclined block 121b, the finishing member 130 may finish the gap between the vertical block 121a and the inclined block 121b to prevent the uneven surface from occurring when the pouch is formed.

For example, the finishing member 130 comprises a coupling part 131 that is coupled to be fitted between the vertical block 121a and the inclined block 121b and a support part 132 supporting each of bottom surfaces of the vertical block 121a and the inclined block 121b. Here, the support part 132 is inserted into an insertion groove formed in the bottom surface of each of the vertical block 121a and the inclined block 121b to improve coupling force between the support part 132 and each of the vertical block 121a and the inclined block 121b.

Particularly, a bottom surface of the support part 132 is disposed on the same horizontal line as the bottom surfaces of the vertical block 121a and the inclined block 121b, and thus, the support part 132 and each of the vertical block 121a and the inclined block 121b are prevented from being stepped therebetween.

Therefore, since the pouch forming apparatus 100 according to the second embodiment of the present invention comprises the finishing member 130, the occurrence of the uneven surface may be prevented when the pouch is formed.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Pouch forming apparatus
110: Die
111: Partition wall
112: Forming groove
112a: Vertical space
112b: Horizontal space
112b-1: One inner wall
120: Punch member
121: Punch
121a: Vertical block
121a-1: Coupling groove
121b: inclined block
121b-1: One surface
121b-2: Coupling protrusion

The invention claimed is:
1. A pouch forming apparatus comprising:
a die defining forming grooves with a partition wall therebetween along a first surface; and
a plurality of punch members, each of the plurality of punch members including a punch configured to be inserted into each of the forming grooves to press a pouch film to form a pair of accommodation grooves in the pouch film, wherein each of the forming grooves comprises a vertical space disposed above a forming groove bottom part and adjacent to the partition wall, and an inclined space connected to the vertical space, the inclined space defined by an inner wall defining an inclined surface facing the partition wall, the punch comprises a vertical block configured to be inserted into the vertical space to press the pouch film, and the punch further comprises an inclined block configured to be inserted into the inclined space to press the pouch film, wherein a surface of the inclined block, which faces the inner wall, is provided as an inclined surface, and wherein the punch comprises a coupling means configured to detachably couple the inclined block to the vertical block, and wherein an inner surface of each of the pair of the accommodation grooves, which is disposed between the inclined surface of the inclined space and the inclined surface of the inclined block, is formed into an accommodation groove inclined surface, wherein the coupling means comprises a coupling groove formed in the vertical block and a coupling protrusion formed on the inclined block and configured to be coupled to the coupling groove.

2. The pouch forming apparatus of claim 1, wherein the inclined block comprises a first block having an inclined surface at a first angle, and a second block having an inclined surface at a second angle, and a block having an inclination angle corresponding to the inclined surface of the inclined space among the first and second blocks is configured to be coupled to the vertical block.

3. The pouch forming apparatus of claim 1, wherein the inclined block has an inclination angle of between 300 to 60°.

4. The pouch forming apparatus of claim 1, further comprising a fixing member configured to fix the inclined block to the punch member.

5. The pouch forming apparatus of claim 1, wherein a finishing member configured to close a gap between the vertical block and the inclined block is provided between the vertical block and the inclined block.

6. The pouch forming apparatus of claim 5, wherein the finishing member comprises a coupling part configured to be inserted between the vertical block and the inclined block and a support part configured to support each of bottom surfaces of the vertical block and the inclined block, and a bottom surface of the support part is disposed on the same horizontal line as bottom surfaces of the vertical block and the inclined block.

7. The pouch forming apparatus of claim 1, wherein the vertical block and the inclined block are configured to be detached from each other during or after use of the pouch forming apparatus.

8. The pouch forming apparatus of claim 1, wherein the inclined block is a first inclined block, and wherein a second inclined block is configured to be coupled to the vertical block after the first inclined block has been detached from the vertical block.

9. The pouch forming apparatus of claim 1, wherein the vertical block and the inclined block are configured to be detached and reattached to one another.

* * * * *